M. PAZOS.
SPRING WHEEL.
APPLICATION FILED DEC. 9, 1913.
1,187,547.
Patented June 20, 1916.
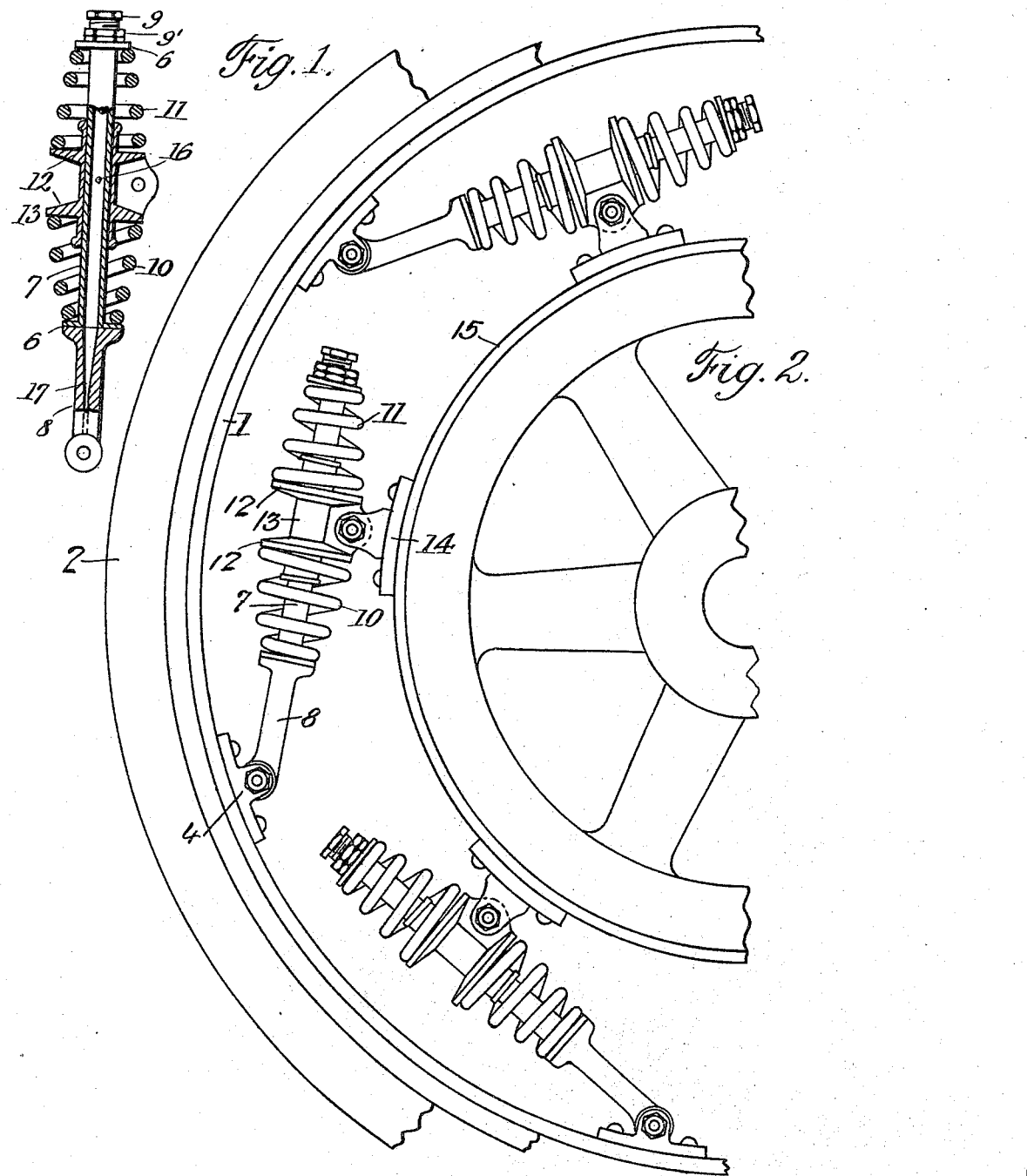
Witnesses:—
Charles B. Crompton.
Fred G. Pohl.
M. Pazos,
Inventor.
By Croydon Marks,
Attorney.
THE COLUMBIA PLANOGRAPH CO., WASHINGTON, D. C.

UNITED STATES PATENT OFFICE.

MANUEL PAZOS, OF BARCELONA, SPAIN.

SPRING-WHEEL.

1,187,547.

Specification of Letters Patent. Patented June 20, 1916.

Application filed December 9, 1913. Serial No. 805,590.

*To all whom it may concern:*

Be it known that I, MANUEL PAZOS, a subject of the King of Spain, residing at 37 Gerona street, Barcelona, Spain, have invented certain new and useful Improvements in Spring-Wheels; and I do hereby declare the following to be a full, clear, and exact description of the invention, such as will enable others skilled in the art to which it appertains to make and use the same.

This invention relates to spring wheels and consists of two rings or rims, an inner one and an outer one, between which are fitted a plurality of devices each consisting of a pair of springs mounted on a pin connected at one end to the outer rim. A sleeve, adapted to slide on each pin, forms an abutment for the adjacent ends of the springs and is hingedly connected to the inner rim. Each of said pins in its normal position, is substantially perpendicular to a line joining the center thereof to the axis of the wheel, but, as soon as some strain is being exerted on them, they oscillate on their support, and alterations are produced in the relative situation of the same and the wheel rims. Under said strains, the sleeves slide on their pins, causing compression of the springs until the strains are counterbalanced. The spring-carrying pins are preferably hollow and may be used as a recipient for lubricant. Said pin, through surrounding holes, communicates with its sleeve, and also through an internal duct with the pivot by which it is connected to the outer rim.

In the accompanying drawings, which show a part of a wheel constructed according to the invention, Figure 1 shows a detail section of one of the spring devices, and Fig. 2 an outside elevation of a portion of the wheel.

The outer rim —1— of the wheel, may bear a rubber or pneumatic tire 2 in the usual way. On its inner side, said outer rim —1— has a certain number of bearings or supports —4— to each of which is pivotally connected a prolongation —8— of a pin —7—. The inner rim —15— is fitted at its outer side with supports —14— to each of which is pivotally connected a sleeve —13— which slides on pin 7. On each end, said sleeve —13— has a flange —12— against which the spiral metallic springs —10— —11— respectively abut.

The pin —7— is hollow and on one of its ends is attached, so as to be rigid therewith a hollow prolongation —8—, pivotally connected to the corresponding bearing 4. The pin —7— is provided with an abutment collar —6— at both ends. The spiral spring —10— is maintained between one of said abutments and one of the flanges 12 of the sleeve, while the second spring —11— is maintained between the other abutment and the other flange of said sleeve. The tension of the springs may be graduated or regulated by nuts —9'—. At one extremity, the pin —7— is open and a screwed plug —9—, is provided to close said open extremity. The rollow pin is intended to be filled with grease, which, when running out through holes —16— lubricates the surface of the sleeve, and when running through channel —17— lubricates the pivot of the bearing 4.

A plurality of resilient devices constituted as above described are placed between the inner rim —15— and the outer wheel rim —1— and conveniently distributed around the periphery.

The strains exerted on the whole system have a tendency to cause the distance to vary between inner and outer wheel rims. They consequently produce compression in one of the spiral springs of each device so that all strains are distributed between the springs and completely deadened.

What I claim as my invention and desire to secure by Letters Patent is:—

1. In a spring wheel, an inner rim, an outer rim, a plurality of sleeves pivotally connected to the inner rim and each having its axis substantially perpendicular to a line connecting the center of such sleeve to the axis of the wheel, a pin passing through each sleeve and connected at one end to the outer rim, and springs fitted between each sleeve and the ends of the corresponding pin, substantially as described.

2. In a spring wheel, an inner rim, an outer rim, a plurality of sleeves pivotally connected to the inner rim and each having its axis substantially perpendicular to a line connecting the center of such sleeve to the axis of the wheel, a pin passing through each sleeve and pivotally connected at one end to the outer rim, a flange on each end of the sleeve and a spring between each of said flanges and the adjacent end of the pin, substantially as described.

3. In a spring wheel, an inner rim, an outer rim, a plurality of sleeves each connected by a pivot, the axis of which is perpendicular to the plane of the wheel, to the inner rim and each sleeve having its axis substantially perpendicular to a line connecting the center of the sleeve to the axis of the wheel, a pin passing through each sleeve and pivoted at one end to the outer rim by means of a pivot the axis of which is also perpendicular to the plane of the wheel, a flange at each end of each sleeve, abutments adjacent the ends of the pins and spaced from said flanges, a pair of springs encircling each pin and abutting against the said flanges and the corresponding abutments, and a nut screwing on the free end of each pin to adjust the tension of the springs, substantially as described.

In testimony whereof I affix my signature in presence of two witnesses.

MANUEL PAZOS.

Witnesses:
CONSTANTINO LOPREY CIAL,
N. JUBERT.

Copies of this patent may be obtained for five cents each, by addressing the "Commissioner of Patents, Washington, D. C."